Nov. 24, 1959     P. F. VERGES ET AL     2,914,280
SUPPORT FOR SELF-SUPPORTING AERIAL CABLES
Filed Sept. 29, 1955
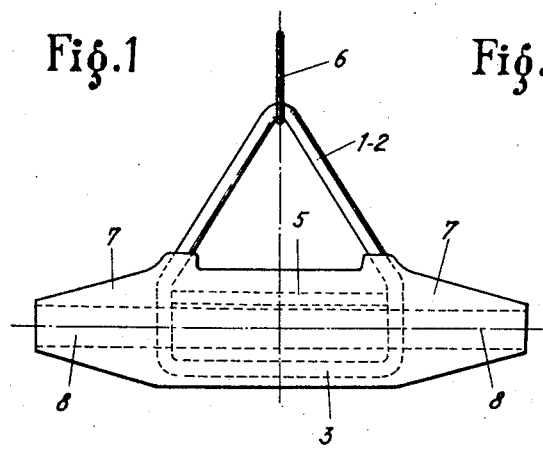
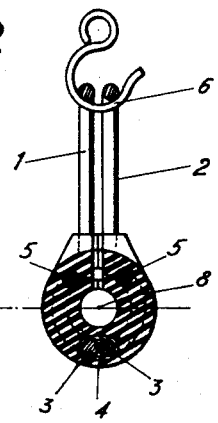
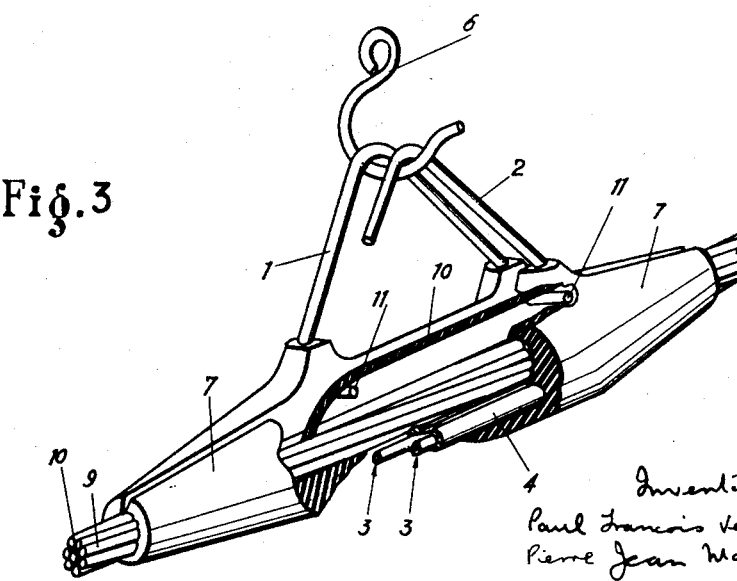
Inventors:
Paul Francois Verges
Pierre Jean Mayet
By Michael S. Striker
Attorney

United States Patent Office 2,914,280
Patented Nov. 24, 1959

2,914,280

SUPPORT FOR SELF-SUPPORTING AERIAL CABLES

Paul François Vergès, Neuilly (Seine), and Pierre Jean Mayet, Paris, France, assignors to Societe Anonyme de Telecommunications, Paris, France Application September 29, 1955, Serial No. 537,506

Claims priority, application France October 13, 1954

9 Claims. (Cl. 248—63)

In order rapidly and temporarily to establish electrical connections, for telephone or telegraph purposes for instance, use is made of aerial cables anchored at intervals either on poles or at suspension points available on the path of the cables, such as trees, walls, etc.

Such aerial cables are called self-supporting cables when they do not require the use of a messenger cable for supporting them along their whole length. The cable, then, includes in its structure either strong steel wires which are braided or twisted, in order to increase the tensile strength of the cable, or a central steel carrying core in the form of a wire either stranded or solid.

Securing such cables at an anchoring point should be an easy and quick operation, and the securing means should be of such a nature that, while supporting the cable, it prevents any longitudinal sliding movement thereof under the action of the tension of suspension, thus limiting the sag of the cable under the action of its own weight.

It is, therefore, necessary that the cable be clamped. The application of clamping means, however, should not cause any local deterioration of the cable, the design and nature of the securing means, therefore, should be selected accordingly.

Moreover, in the case of a cable with a carrying core it is often preferable that only the carrying core be subjected to the suspension effort, and the securing means, then, must combine, on one hand means for suspending and clamping the carrying core which will be, beforehand cleared of the surrounding conductors, and, on the other hand, means for protecting the conductors locally spaced away from the carrying core.

These fundamental principles led to the present invention which, therefore, has for its main object a type of universal support for anchoring an aerial cable of any type, and the dimensions of which, of course, will vary according to the size and weight of the cable.

Moreover, in some instances, and mainly when the cost of installation of a well determined type of cable is particularly to be taken in consideration, it may be advantageous to resort to an anchoring support of a less universal type.

For this purpose, the invention has for secondary objects a number of modifications derived from the aforesaid support which suit more particularly and economically the installation of some types of cables.

Other and further objects and advantages of the invention will be apparent to those skilled in the art, from a consideration of the following description of some specific embodiments of the invention shown by way of examples in the accompanying drawings in which Figs. 1, 2 and 3 show, in side elevational, middle cross section, and perspective views, respectively, the universal type support which is the main object of the invention.

In all the figures of the drawings, like reference numbers denote like members.

It should be understood that the showings of Figs. 1 to 3 are not to be taken in a sense likely to restrict the scope of the invention, the fundamental principles of which are hereinabove defined.

In Figs. 1, 2 and 3, it is readily seen that the universal type support is designed in the form of a clamp adapted to be closed around the cable.

The elementary jaws 1 and 2 are essentially constituted by a metal armature, preferably in the shape of a loop in order that its weight be reduced to the greatest possible extent, the horizontal lower branches 3 of which are connected by a tubular hinge 4.

From these horizontal lower branches extend the lateral branches, first curved into half circles in order to wrap the cable, then braced by the bracing members 5, and merging into an inverted V for hooking on a conventional hook 6 adapted to be connected to any known type of suspension or anchoring means.

On the assembly formed by both elementary jaws 1 and 2 and their lower hinge 4 is moulded a body 7 of resiliently deformable material such as rubber, plastics, or the like.

In the middle of this body 7 is provided a longitudinal cylindrical passage 8 adapted to accommodate a single or multiple cable 9. The passage 8, in the middle portion of the body 7 communicates with a recess adapted to accommodate a carrying core 10 and provided, if need be, with two core supporting pegs 11 of metal welded against the jaw 1 and extending horizontally from the portion of the body that surrounds said jaw 1 and engaging suitable recesses in register with said pegs in the portion of the body that surrounds the jaw 2.

The molding operation of the body 7 on the jaws 1 and 2 is effected in such a manner that, at rest, the jaws are ajar an angle such that it is easy to introduce the cable therebetween and, if need be, to hook the carrying core, while the support, under such conditions, is supported by the jaw 1 only, during this operation.

Closing the support is then effected without any difficulty since the resiliency of the body 7 makes it possible, by a mere manual action, to hook the jaw 2 in the hook 6, whereby the weight of the cable is sufficient for maintaining the device in closed position.

The clamping effect on the cable and, if need be, on the carrying core, results from the fact that the diameter of the central passage through the body as well as the width of the middle recess in said body, after closing of the jaws, are slightly smaller than the corresponding dimensions of the cable. Moreover, the inner surface of the body which is in engagement with the cable and the core may be provided with serrations or like roughened portions precluding any longitudinal sliding movement of the cable.

The dampening property of the resilient material constituting the body 7 prevents any local deterioration of the conductors and the core in spite of the clamping effect, and, moreover, it will be noticed that the body 7 extends materially on either side of the jaws and that the resiliency of these extensions avoid any sharp bend of the conductors which, even slight, would likely deteriorate then.

Obviously, the dimensions of the support according to the invention should match those of the cable to be anchored and the anchoring intervals, while it is emphasized that the invention is independent of this question of size. The same is true:

(1) Of the structure of the jaws which, instead of being widely apertured as represented in the drawings, may be constituted, for instance, by plates having the same general conformation and provided with a hooking eye;

(2) Of the area and arrangement of the clamping surfaces as well as the clamping process itself, which if need be, will be possibly strengthened by means of bolts welded onto the jaw 1 between the body of the support and the hooking point for this jaw, extending through the jaw 2 and receiving an outer clamping nut. In this case, the hinge 4 may be omitted since this omission has an advantage when it comes to the installation of a heavy cable with a supporting core, as it will be explained further on.

When the cable is not provided with a carrying core, or in the case of a core cable if it is not intended to attach the core separately, the special recess provided in the middle of the body may be omitted, as well as the pegs 11. This modification is self-explanatory, but the invention in such a modification claims the organization of a body which makes it possible to simultaneously anchor a plurality of cables, that is to say a structure comprising several superimposed longitudinal passages.

In the case of a cable with a supporting core adapted to be suspended and clamped separately, the universal support which is the main object of the invention will be normally resorted to.

As many changes could be made in the above construction, and many widely different embodiments of this invention could be made without departing from the scope of the claims it is intended that all matter contained in the above description or shown in the accompanying drawings shall be interpreted as illustrative and not in a limiting sense.

What we claim is:

1. A suspension device for self-supporting aerial cables comprising, in combination, a pair of clamping frames, each clamping frame having an elongated supporting portion and a connecting bent portion connecting the ends of said elongated portion and extending upwardly from the same, said supporting portions being parallel; elongated hinge means connecting said supporting portions so that said frames are movable from a position in which said connecting portions are closer spaced but out of contact to a farther spaced position; casing means attached to said frames adapted to receive a cable and located between said connecting portions, said casing having with a cable therein an outer diameter large enough to prevent said connecting portions to move toward each other beyond said closer spaced position in which they are still out of contact with each other; and a hook member holding said connecting portions in said closer spaced position for clamping a cable located in said casing and suspended by said clamping frames.

2. A suspension device for self-supporting aerial cables, comprising, in combination, resilient elongated casing means, said elongated casing means being formed with a longitudinal slot extending inwardly from the top surface thereof, said casing means being adapted to receive a cable in the inwardly located portion of said slot; a pair of clamping frames, each clamping frame having an elongated supporting portion embedded in said casing means and extending in longitudinal direction of said casing means and a connecting bent portion connecting the ends of said elongated supporting portion and extending upwardly from said casing, said connecting portions of said clamping frames being located on opposite sides of said slot and being movable angularly between a more closely spaced position for clamping a cable located in said slot but out of contact with each other and a farther spaced position in which said slot is widened for passing of the cable therethrough, said casing having with a cable therein an outer diameter large enough to prevent said connecting portions to move toward each other beyond said closer spaced position in which they are still out of contact with each other; and a hook member holding said connecting portions in said closer spaced position for clamping a cable located in said casing means and suspended by said clamping frames.

3. A suspension device for self-supporting aerial cables, comprising, in combination, resilient elongated casing means, said elongated casing means being formed with a longitudinal slot extending inwardly from the top surface thereof, said casing means being adapted to receive a cable in the inwardly located portion of said slot; a pair of clamping frames, each clamping frame having an elongated supporting portion embedded in said casing means and extending in longitudinal direction of said casing means and a connecting bent portion connecting the ends of said elongated supporting portion and extending upwardly from said casing, said connecting portions of said clamping frames being located on opposite sides of said slot; a tubular hinge member enveloping said supporting portions and connecting said frames for angular movement between a more closely spaced position for clamping a cable located in said slot but out of contact with each other and a farther spaced position in which said slot is widened for passing of the cable therethrough, said casing having with a cable therein an outer diameter large enough to prevent said connecting portions to move toward each other beyond said closer spaced position in which they are still out of contact with each other; and a hook member holding said connecting portions in said closer spaced position for clamping a cable located in said casing means and suspended by said clamping frames.

4. A suspension device as set forth in claim 3 wherein each of said connecting bent portions has a center portion having inverted V-shape and being engaged by said hook member.

5. A suspension device as set forth in claim 4 wherein each of said connecting portions includes a pair of arcuate intermediate portions extending perpendicularly from the ends of the respective supporting portion and merging into the ends of said center portion.

6. A suspension device as set forth in claim 3 wherein said resilient casing means has a length greater than the length of said supporting portions of said clamping frames and than the length of said tubular hinge member so that the end portions of said casing means extend beyond the ends of said supporting portions for supporting the cable received in said slot along a greater length.

7. A suspension device for self-supporting aerial cables, comprising, in combination, resilient elongated casing means, said elongated casing means being formed with a longitudinal slot extending inwardly from the top surface thereof, said slot having a narrow outwardly located radially extending portion, and a wider portion located at the center of said casing means, said casing means being adapted to receive a cable in the inwardly located wider portion of said slot; a pair of clamping frames, each clamping frame having an elongated supporting portion embedded in said casing means below said slot and extending in longitudinal direction of said casing means and a connecting bent portion connecting the ends of said elongated supporting portion and extending upwardly from said casing, said connecting portions of said clamping frames being located on opposite sides of said slot; a tubular hinge member enveloping said supporting portions and connecting said frames for angular movement between a more closely spaced position for clamping a cable located in said slot but out of contact with each other and a farther spaced position in which said slot is widened for passing of the cable therethrough, said casing having with a cable therein an outer diameter large enough to prevent said connecting portions to move toward each other beyond said closer spaced position in which they are still out of contact with each other; and a hook member holding said connecting portions in said closer spaced position for clamping a cable located in said casing means and suspended by said clamping frames.

8. A suspension device as set forth in claim 7 wherein said centrally located portion of said slot is cylindrical; and wherein each of said connecting bent portions includes an arcuate portion substantially concentric with said cylindrical slot portion and extending in said resilient elongated casing means about said cylindrical slot portion.

9. A suspension device as set forth in claim 7 wherein said hook member has a substantially semi-circular engaging hook portion; and wherein each of said connecting bent portions has an angular central portion engaged by said hook portion so that said clamping frames tend to slide in said hook portions under the action of gravity to a position in which said connecting bent portions are in said closely spaced position.

References Cited in the file of this patent

UNITED STATES PATENTS

| | | |
|---|---|---|
| 2,364,982 | Kaufmann | Dec. 12, 1944 |
| 2,396,837 | Ellinwood | Mar. 19, 1946 |
| 2,416,063 | Nickolls | Feb. 18, 1947 |
| 2,423,222 | Berry | July 1, 1947 |

FOREIGN PATENTS

| | | |
|---|---|---|
| 895,215 | Germany | Nov. 2, 1953 |